United States Patent [19]

Skingle et al.

[11] Patent Number: 4,920,864

[45] Date of Patent: May 1, 1990

[54] REINFORCED PISTON

[75] Inventors: Thomas J. Skingle, Parma; Milton W. Toaz, Bedford, both of Ohio

[73] Assignee: JPI Transportation Products, Inc., Ann Arbor, Mich.

[21] Appl. No.: 338,196

[22] Filed: Apr. 14, 1989

[51] Int. Cl.[5] .............................. F02F 3/06; F16J 1/04

[52] U.S. Cl. .............................. 92/213; 92/212; 92/224

[58] Field of Search .............................. 92/213, 212, 239, 231, 92/260, 176; 123/193 P, 668

[56] References Cited

U.S. PATENT DOCUMENTS

| | | | |
|---|---|---|---|
| 2,194,097 | 3/1940 | Reggio | 92/224 |
| 2,243,263 | 5/1941 | Starr | 92/213 |
| 3,187,643 | 6/1965 | Pope | 92/176 |
| 4,242,948 | 1/1981 | Stang et al. | 92/224 |
| 4,658,706 | 4/1987 | Sander et al. | 92/213 |
| 4,708,104 | 11/1981 | Day et al. | 123/193 P |
| 4,735,128 | 4/1988 | Mahrus et al. | 92/213 |
| 4,739,738 | 4/1988 | Sander et al. | 123/193 P |
| 4,751,871 | 6/1988 | Burghardt | 92/224 |

*Primary Examiner*—Willis R. Wolfe
*Assistant Examiner*—M. Macy
*Attorney, Agent, or Firm*—Harness, Dickey & Pierce

[57] ABSTRACT

A reinforced lightweight metal piston having fibers within the piston crown to reinforce the crown surface to improve the thermal properties and wear resistance of the crown surface. The reinforcing fibers are embedded in the piston metal using a pressure casting process used to manufacture the piston. The fibers are selected from the group of aluminum silicate, alumina, silicon carbide, silicon nitride, boron, boron carbide and graphite. The fibers can be orientated in the preform in several various directions. The wear resistance of the piston crown can be further increased by the addition of a ferrous heat plug. The fiber reinforced portion is located around the heat plug and provides improved physical and mechanical properties of the piston crown to reduce cracking of the crown around the heat plug and loosening of the heat plug due to metal creep.

10 Claims, 2 Drawing Sheets

REINFORCED PISTON

BACKGROUND AND SUMMARY OF THE INVENTION

This invention relates generally to a lightweight metal piston for an internal combustion engine and in particular to a piston having a reinforced upper surface for improved erosion resistance, crack resistance and creep resistance.

It has been common for several years to manufacture pistons from lightweight metals such aluminum, magnesium, titanium and alloys of aluminum, magnesium and titanium. The use of lightweight metals in a piston reduces the mass and inertia of the piston, improving the fuel economy of the engine. However, many lightweight metals are not able to withstand the conditions encountered in operation. For example, in diesel engines it is not uncommon to include a precombustion chamber with each cylinder chamber from which a flame propagates into the cylinder chamber and impinges upon the surface of the piston crown. Without some form of reinforcement, the flame will erode the crown surface of a lightweight metal piston.

To prevent erosion of the crown surface, a ferrous heat plug may be used to protect the crown surface. The heat plug consists of an insert resembling a short, four-stroke engine valve in appearance. The heat plug has a circular top surface which covers a portion of the crown upper surface to protect the crow surface from the flame. The heat plug includes a stem which penetrates the crown of the piston. The heat plug is retained in place by threading a retaining nut onto the stem from the underside of the crown. The heat plug dissipates the heat generated at the crown surface during flame propagation from the precombustion chamber and also provides an erosion resistant surface against the jetting flame front. To function effectively, the heat plug must be tightly affixed to the piston in order to provide excellent heat transfer and effect a tight seal of the combustion gases.

However, at some point in the life of a heat plug piston, generally between 1,000 and 2,000 hours of operation, cracks form in the crown which radiate outward from the heat plug. The cracking is caused by thermal cycling which occurs as the engine responds to its duty cycle. As the engine operating hours extend, the cracks grow in length, width, and depth. Eventually, the proliferation of cracking can result in gas penetration and finally torching of the piston crown.

In addition, the thermal cycling can cause material creep or relaxation. This in turn can result in loosening of the heat plug. Once loosening occurs, movement of the heat plug in the piston crown may cause the retaining nut to release and the plug to float in the combustion chamber causing catastrophic engine failure.

Accordingly, it is an object of this invention to overcome the disadvantages of a heat plug piston by providing a reinforcement of the piston crown surrounding the heat plug to resist cracking and material relaxation.

The invention reinforces the aluminum piston crown with reinforcing fibers which impart material characteristics to the crown to inhibit the formation of thermal cracks, improve the creep resistance of the crown and improve the erosion resistance of the crown surface. The invention utilizes reinforcing fibers in the form of a cylindrical preform typically prepared by a vacuum forming process. The fiber preform is incorporated into the piston metal matrix alloy through a pressure casting process commonly used to manufacture pistons.

Research has shown that the physical and mechanical properties of a monolithic alloy can be significantly influenced by the selective addition of the reinforcing fibers. For example, it has been found that physical properties such as thermal expansion and thermal conductivity and mechanical properties such as strength, hardness, fatigue, and wear can be modified by relatively small additions of reinforcing fibers.

The problems of thermal cracking and creeping in conventional heat plug pistons is primarily related to the large disparity in elevated temperature strength and coefficient of thermal expansion between the aluminum piston and the steel heat plug. The thermal expansion coefficient of aluminum can be brought closer to that of steel and the elevated temperature yield strength of the aluminum nearly doubled by the appropriate addition of reinforcing fibers. The placement of the reinforcing fibers in the piston crown, around the ferrous heat plug, favorably changes the characteristics of the piston such that formation of radial thermal fatigue cracks is substantially retarded and the growth of the cracks is subdued. The potential creep in the crown is greatly reduced so there is less tendency for the heat plug to loosen during service.

It is an advantage of the invention that the selective reinforcement of the piston crown with fibers allows the properties of the piston alloy to be adjusted to more closely match the properties of the ferrous heat plug. The congruence in the performance between the two metals extends the life and durability of the piston of the present invention over the prior art.

The present invention may incorporate several design combinations in order to achieve the objectives of extended piston life. The geometry of the reinforced area may be varied in terms of the diameter and height or thickness of the fiber preform. The composition and other characteristics of the reinforcing fibers such as diameter, length, surface coating, etc. may be selected from any of wide range of reinforcing fibers. These include alumino-silicate, alumina, silicon carbide, silicon nitride, boron, boron carbide, and graphite. The amount and volume of the fibers may also be varied with respect to the volume of the metal alloy. The fibers may be aligned in a variety of orientations relative to the piston body. The lightweight piston metal will most commonly be aluminum and its alloys, but could also be magnesium or titanium and alloys of magnesium and titanium.

The preferred method for incorporating the reinforcing fibers into the piston metal is a squeeze casting process. However, it is possible to produce a reinforced piston using other casting techniques such as die casting or centrifugal casting.

It has also been found that by reinforcing a portion of the piston crown with ceramic fibers, that the reinforced portion provides sufficient erosion resistance to the crown surface where it is impinged with the flame front that a ferrous heat plug may no longer be required. By eliminating the ferrous heat plug, several deficiencies in prior art pistons are avoided such as the disparity in the thermal expansion and creep resistance of the two dissimilar metals.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
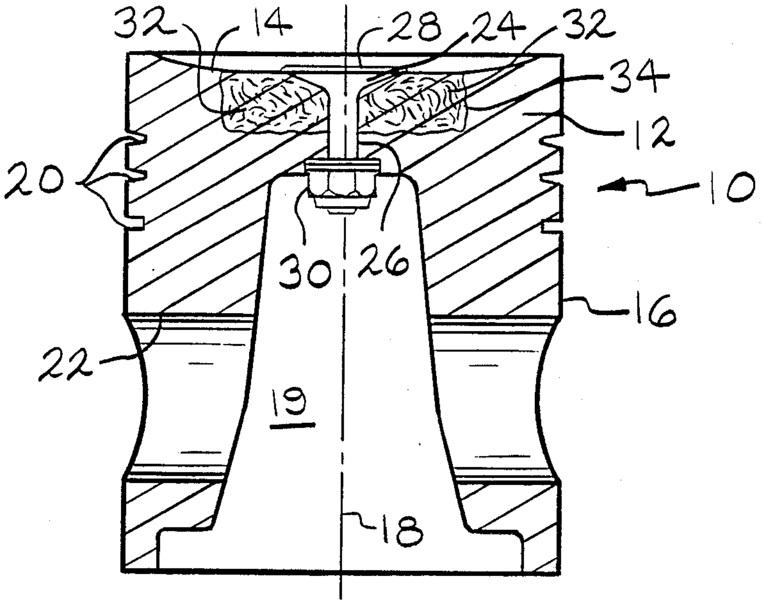
FIG. 1 is a vertical sectional view of a heat plug piston having a reinforced crown according to this invention.

The fiber reinforced piston of the present invention is shown in FIG. 1 and designated generally as 10. The piston 10 includes a crown 12 illustrated as having a dish-shaped top surface 14 and an annular skirt 16 extending downwardly from the crown 12 about a longitudinal axis 18 forming a cavity 19. The periphery of the piston 10 includes three piston ring grooves 20 and a bore 22 for a wrist pin used to connect the piston 10 to a connecting rod (not shown).

A heat plug 24 is centered in the crown 12 of the piston. The heat plug includes a stem 26 which penetrates through the crown 12. At its upper end, the heat plug flares radially outwardly forming a circular top surface 28 covering the center of the crown upper surface 14. The heat plug is secured to the crown by a retaining nut, or other suitable fastening means, threaded to the stem in the cavity 19.

The upper surface 14 of the crown 12 is reinforced around the heat plug 24 by reinforcing fibers 32. The reinforcing fibers 32 are arranged in the form of a cylindrical preform 34 which has a diameter two to ten times greater than its axial length as shown in FIG. 1. The preform 34 is placed in the crown with the outer surface of the preform at the upper surface of the crown.

The preform 34 is a body of fibers 32 with interstices between the fibers. The preform is typically rigidized by the addition of an inorganic binder to give the preform durability. The piston 10 is molded by a conventional pressure casting process, described below, in which the piston matrix metal is forced into the interstices so as to completely surround the individual fibers 32.

The fibers reinforce the crown around the heat plug and give the piston metal physical and mechanical properties more similar to the ferrous heat plug. The thermal expansion coefficient of the reinforced lightweight metal of the crown is closer to that of the ferrous heat plug with the addition of the reinforcing fibers 32. The elevated temperature yield strength of the piston crown is also increased. The fiber preform thus reduces the formation of cracks and their growth and reduces the potential for creep in the crown which can cause the heat plug to loosen.

Figure 2:
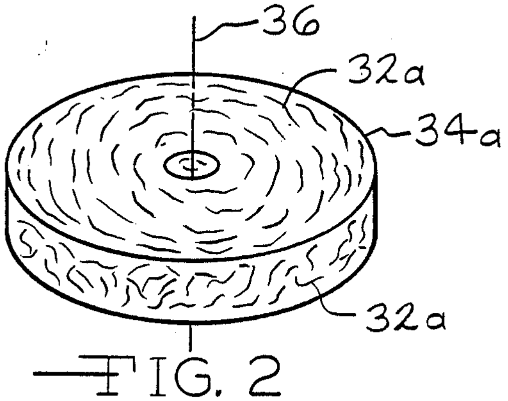
FIG. 2 is perspective view of the reinforcing fiber preform with the fibers in a two-dimensional random orientation in circumferential planes.
Figure 3:
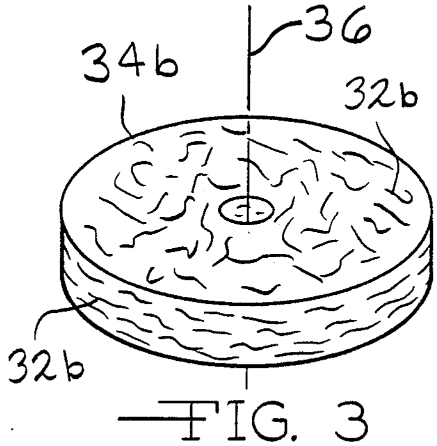
FIG. 3 is a perspective view of the reinforcing fiber preform with the fibers in a two-dimensional orientation in planes normal to the longitudinal axis of the piston.
Figure 4:
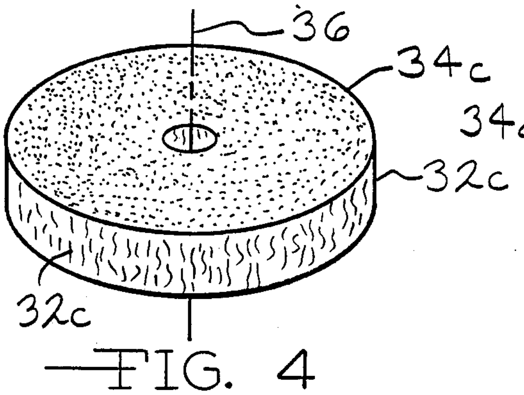
FIG. 4 is a perspective view of the reinforcing fiber preform with the fibers orientated in a direction parallel to the longitudinal axis of the perform.
Figure 5:
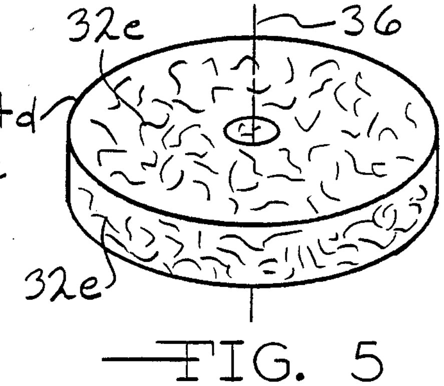
FIG. 5 is a perspective view of the reinforcing fiber preform with the fibers randomly oriented in three-dimensions.

The orientation of the fibers 32 in the preform can be varied as shown in FIGS. 2–5. In FIG. 2, the fibers 32*a* of preform 34*a* are shown as being randomly oriented in two-dimensions in planes circumferential to the circular preform. In FIG. 3, the fibers 32*b* of the preform 34*b* are randomly oriented in two-dimensions in planes normal to the axis 36 of the preform. In FIG. 4, the fibers 32*c* of the preform 34*c* are oriented parallel to the axis 36 of the preform. In FIG. 5, the fibers 32*d* of the preform 34*d* are randomly oriented in all three directions. The fibers used in the preform can be made of one or more of several reinforcing materials including alumino-silicate, alumina, silicon carbide, silicon nitride, boron, boron carbide, and graphite. The metal used for casting the piston is generally aluminum or aluminum alloys but can also be magnesium or titanium or alloys of magnesium and titanium.

The diameter and height of the preform can be varied depending upon the desired reinforcing characteristics. Likewise, the selection of fibers as well as their diameter, length and any surface coating can also be varied. The amount and density of the fibers may also be varied.

The density of the fibers can be varied within a given preform. In a preform with varying fiber density, the maximum fiber density is in the radially inner portion of the preform with the density decreasing radially outwardly to the periphery of the preform.

In the past, heat plugs have been typically made of heat resistant ferrous alloys. Heat plugs may however be made of other materials such as various ceramic materials. The fiber reinforced piston of the present invention is useful with heat plugs of any material where the piston matrix metal and the heat plug have differing physical and mechanical properties. The fiber composition, density and orientation can be varied such that the piston crown surrounding the heat plug has similar properties as the heat plug.

Figure 6:
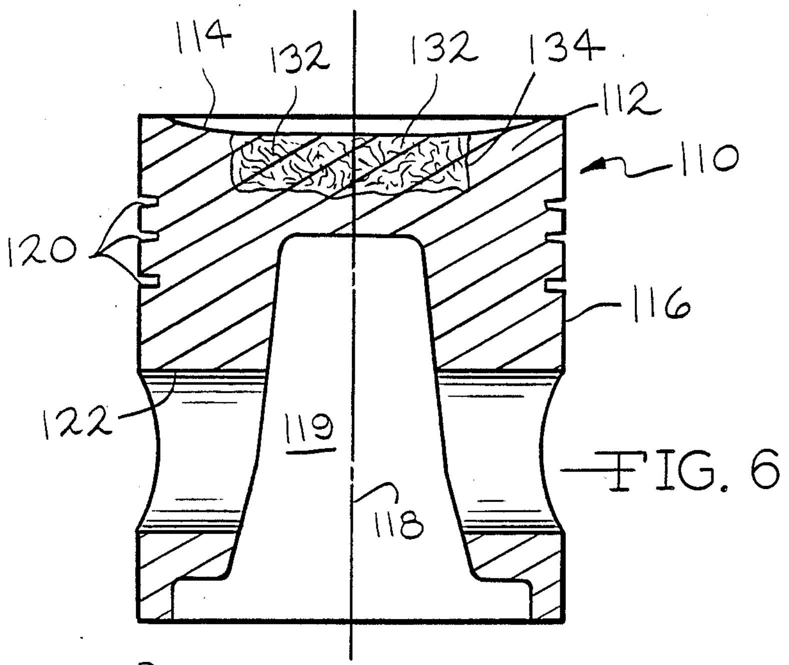
FIG. 6 is a view similar to FIG. 1 of a piston having a reinforced crown of the present invention without a heat plug.
Figure 7:
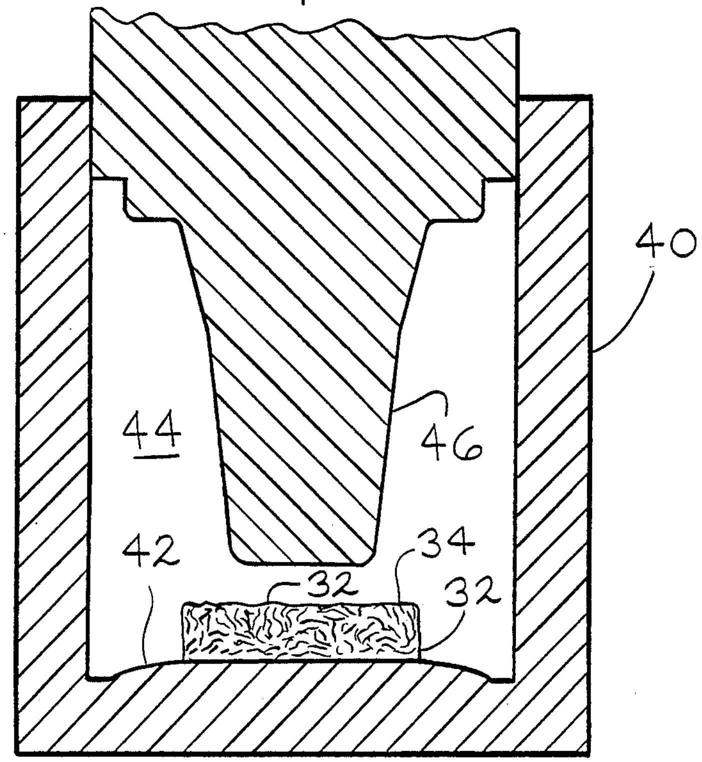
FIG. 7 is a vertical sectional view of a mold for squeeze casting a piston of the present invention.

A modified form of the present invention is shown in the piston 110 in FIG. 6. In FIG. 6, elements of the piston 110 which are similar to elements of piston 10 in FIG. 1, are denoted by the same reference numeral with the addition of 100. Piston 110 is identical to piston 10 except that the heat plug 24 has been deleted from piston 110. A primary function of the heat plug is to provide an erosion resistant top surface to protect the crown upper surface from wear caused by flame. With the addition of the reinforcing fiber preform to the crown, the upper surface of the crown is sufficiently erosion resistant that a heat plug may not be necessary.

The reinforced piston of this invention is cast by placing a preform 34 of the reinforcing fibers into a piston die cavity 40 as shown in FIG. 2. The piston is cast in a hollow die cavity 40 which has a contoured bottom surface 42 which is complementary to the dish-shaped top surface 14 of the piston crown shown in FIG. 1. The fiber preform 34, which can be made using a conventional preforming process such as vacuum forming, is placed in the die cavity 40 on the surface 42. The die cavity 40 is opened at the top to allow a molten metal or metal alloy to be poured into the die cavity. Once the molten metal is poured in the cavity, the die is closed by a top punch 46 which is inserted into the opening at the top of the die cavity 40. The punch 46 has a contour complementary to the bottom cavity 19 (FIG. 1) in the piston 10.

The punch 46 exerts a pressure on the molten metal which continuously forces the alloy against the wall of the die cavity and into the interstices in the fiber preform 34 between the individual fibers 32 such that the fibers are encapsulated by the molten metal. As the metal solidifies, the top punch enters the die cavity further with metal shrinkage. The pressure applied by the punch results in a piston having good conformity to the die cavity surface, a fine micro-structure and relatively little or no porosity. Once the piston has been cast and removed from the die cavity 30, the piston ring grooves 20, the wrist pin bore 22 and other features are machined into the piston 10.

While the preferred casting process is open-die squeeze casting, as described above, the present invention may be produced by closed-die pressure casting or other casting processes which achieve infiltration of the matrix alloy into the interstices in the fiber preform.

The piston of the present invention provides a crown reinforcement which consists of the piston crown having a preform of reinforcing fibers embedded therein. The reinforcement may also include a ferrous heat plug extending through the crown to further improve wear resistance of the crown top surface. The wear resistance of the crown surface is of particular concern for pistons in an engine employing precombustion chambers in which a flame front from the precombustion chamber impinges upon the piston surface. The fiber reinforced portion provides increased wear resistance and also results in physical and mechanical properties which are similar to that of a ferrous heat plug. This reduces the thermal cracking of the piston crown and loosening of the heat plug due to material creep over time.

It is to be understood that the invention is not limited to the exact construction or method illustrated and described above, but that various changes and modifications may be made without departing from the spirit and scope of the invention as defined in the following claims.

What is claimed is:

1. A lightweight metal piston having a reinforced upper surface to improve the ability of the piston to withstand thermal cracking and metal creep, said piston comprising:

a cylindrical body having a longitudinal axis, a crown substantially normal to said axis having an upper surface, and a cylindrical skirt extending downwardly from said crown forming a hollow interior cavity;

a heat plug disposed within said crown, said heat plug having a circular top surface of a predetermined diameter covering a portion of said crown upper surface to provide an erosion resistant top surface, a stem having a diameter less than said predetermined diameter extending through said crown and means operatively associated with said stem and said crown for securing said heat plug to said crown, said heat plug being of a material different than said piston lightweight metal and having different material properties; and means in said crown adjacent said crown upper surface around said heat plug for altering the material properties to reduce the difference in material properties between said heat plug and said piston metal and for reinforcing said crown, said means including reinforcing fibers fully embedded in the metal of a portion of said crown surrounding said heat plug.

2. The piston of claim 1 wherein said piston is made of a metal selected from the group of aluminum, magnesium, titanium and alloys of aluminum, magnesium and titanium.

3. The piston of claim 1 wherein said fibers are intermingled together to form a preform, said preform including interstices between said fibers and said interstices being filled with metal of the piston so as to embed said fibers in said crown.

4. The piston of claim 1 wherein said fiber reinforced portion of said crown is cylindrical in shape with the diameter being between two and ten times the axial length of said reinforced portion and said portion being radially centered in said crown to reinforce the center of said crown upper surface.

5. The piston of claim 1 wherein the density of fibers decreases in a direction radially outwardly from said heat plug to form a transition in the material properties of said crown from the portion surrounding the heat plug radially outwardly to the periphery of said reinforced portion.

6. The piston of claim 1 wherein said reinforcing fibers are selected from the group of alumino-silicate, aluminia, silicon carbide, silicon nitride, boron, boron carbide and graphite.

7. The piston of claim 4 wherein said reinforcing fibers in said crown are randomly oriented in three directions.

8. The piston of claim 4 wherein said reinforcing fibers in said crown are axially oriented.

9. The piston of claim 4 wherein said reinforcing fibers in said crown are randomly oriented in two dimensions in circumferential planes about said axis.

10. The piston of claim 4 wherein said reinforcing fibers in said crown are randomly oriented in two dimensions in planes normal to said axis.

* * * * *